United States Patent [19]
Dotter

[11] 3,828,821
[45] Aug. 13, 1974

[54] PRESSURE REGULATOR FAUCET SLIDE VALVE

[76] Inventor: John Henry Dotter, 810 Ocean Monarch Condominium, 133 N. Pompano Beach Blvd., Pompano Beach, Fla. 33062

[22] Filed: Mar. 2, 1971

[21] Appl. No.: 120,177

Related U.S. Application Data
[63] Continuation-in-part of Ser. No. 765,776, Oct. 8, 1968, abandoned.

[52] U.S. Cl............ 137/636.4, 137/613, 137/625.4, 137/625.48, 251/174, 251/325
[51] Int. Cl..................... F16k 11/18, G05d 16/00
[58] Field of Search ...... 137/542, 606, 607, 614.16, 137/614.17, 614.18, 614.2, 625.38, 625.39, 625.68, 636, 637.4, 613, 636.4, 625.4, 625.48

[56] References Cited
UNITED STATES PATENTS

| | | | |
|---|---|---|---|
| 39,812 | 9/1863 | Hayman........................ | 137/625.68 |
| 1,962,549 | 6/1934 | Bjorklund...................... | 137/542 X |
| 2,291,563 | 7/1942 | Rotter........................... | 137/625.68 |
| 2,307,199 | 1/1943 | Cooper.......................... | 137/613 X |
| 2,751,919 | 6/1956 | Keil............................... | 137/614.2 X |
| 2,949,933 | 8/1960 | Moen............................ | 137/614.18 X |
| 2,969,923 | 1/1961 | Fremion........................ | 137/625.48 X |
| 3,245,430 | 4/1966 | Enterante ..................... | 137/637.4 |
| 3,370,610 | 2/1968 | Miner............................ | 137/614.16 |
| 3,414,018 | 12/1968 | Eversman ..................... | 137/636.4 X |
| 3,550,623 | 12/1970 | Katchka......................... | 137/613 |
| R16,524 | 1/1927 | Fitl................................ | 251/321 X |

FOREIGN PATENTS OR APPLICATIONS

| | | | |
|---|---|---|---|
| 619,219 | 9/1935 | Germany....................... | 137/625.48 |
| 28,292 | 8/1921 | Denmark....................... | 251/325 |

*Primary Examiner*—William R. Cline
*Assistant Examiner*—Richard Gerard
*Attorney, Agent, or Firm*—Carothers & Carothers

[57] ABSTRACT

A pressure regulating faucet that maintains a predetermined discharge pressure less than the supply pressure regardless of the amount of water issuing from the faucet in combination with parts in a flat face slide valve surface to regulate the amount of water issuing from the faucet or the proportionate mixture of different or hot and cold water and in combination with a concentric rotary proportioning selector valve having an axial bore containing the pressure regulator valve operable axially within the bore of the rotary selector valve. The slide valve and the rotary proportioning valve and the pressure regulating valve are coaxially concentric to each other cooperating in performing their valvular function upon the water entering the housing radially and discharging axially.

15 Claims, 13 Drawing Figures

PATENTED AUG 13 1974　　3,828,821

INVENTOR.
JOHN HENRY DOTTER
BY
CAROTHERS & CAROTHERS
HIS ATTORNEYS

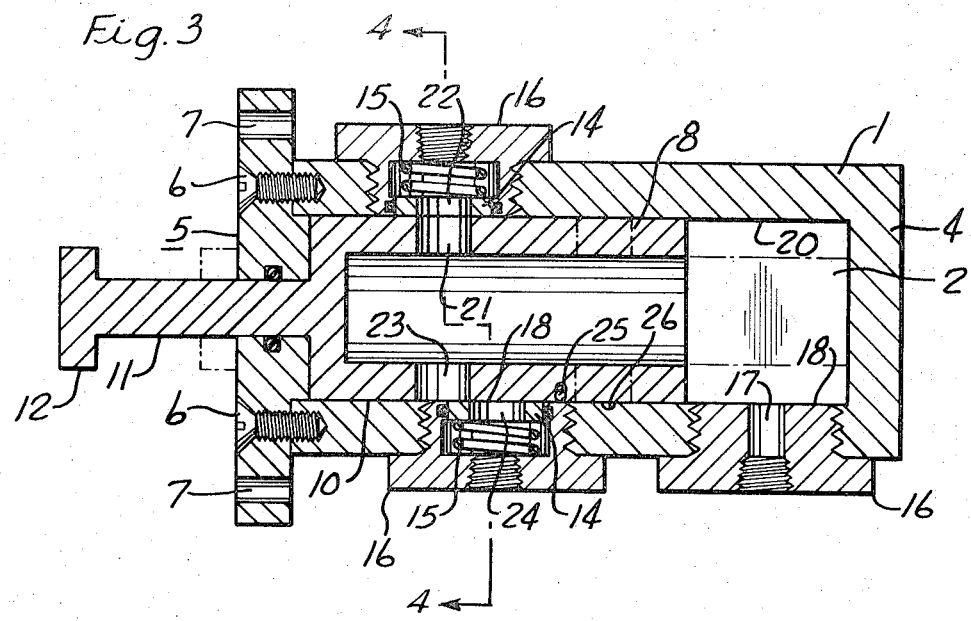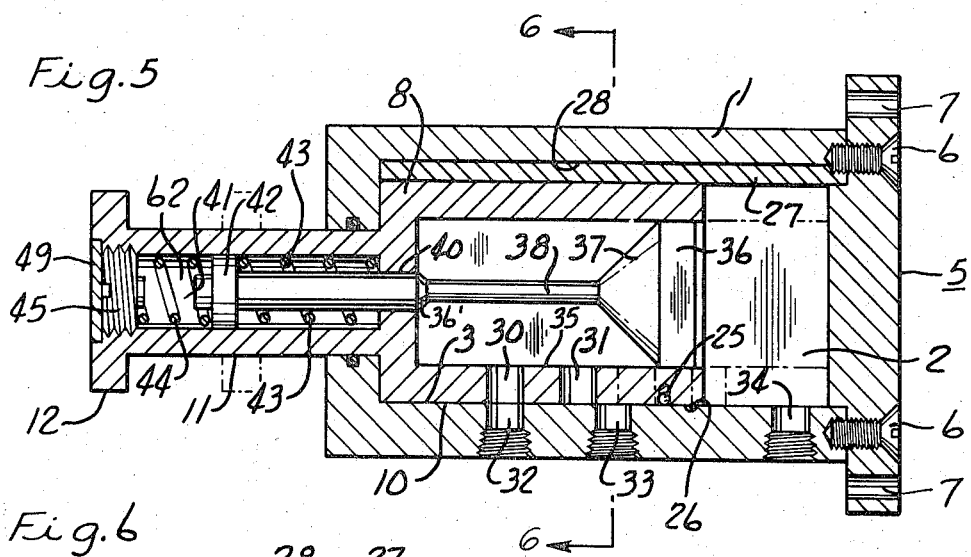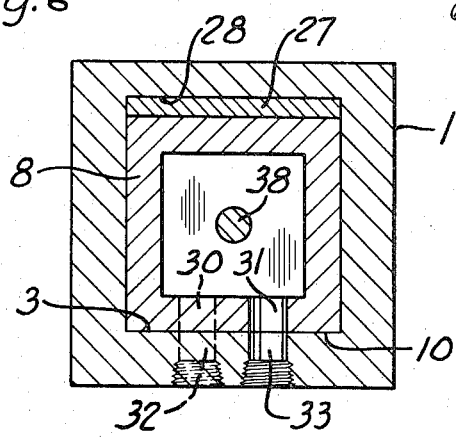

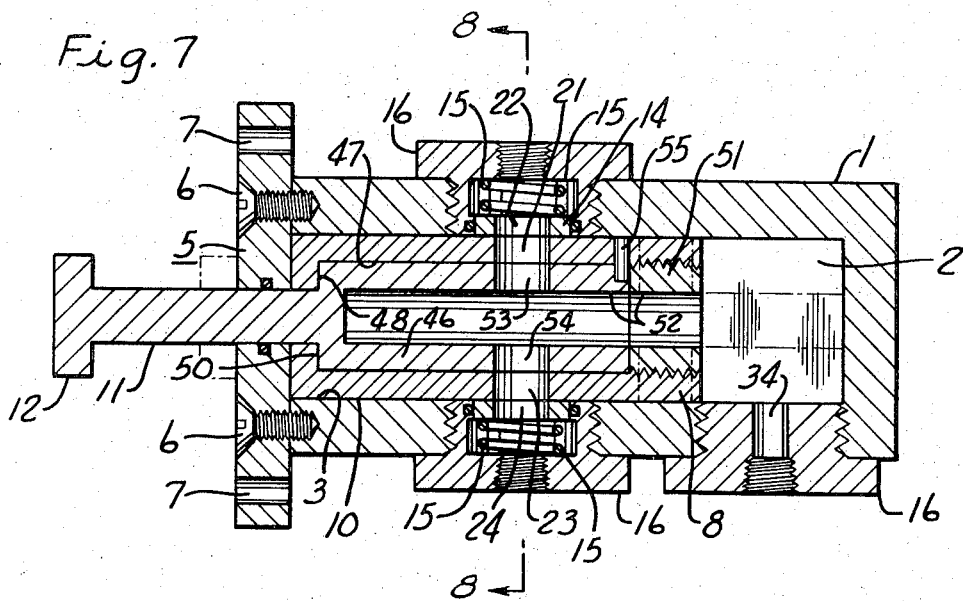
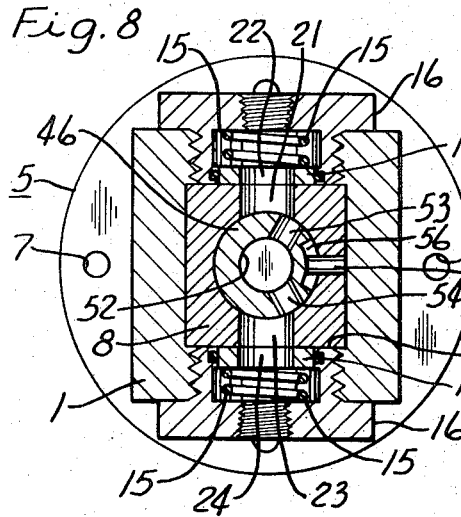
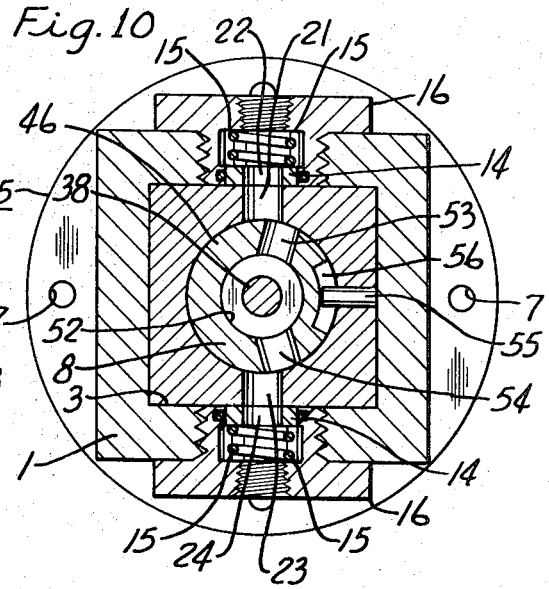

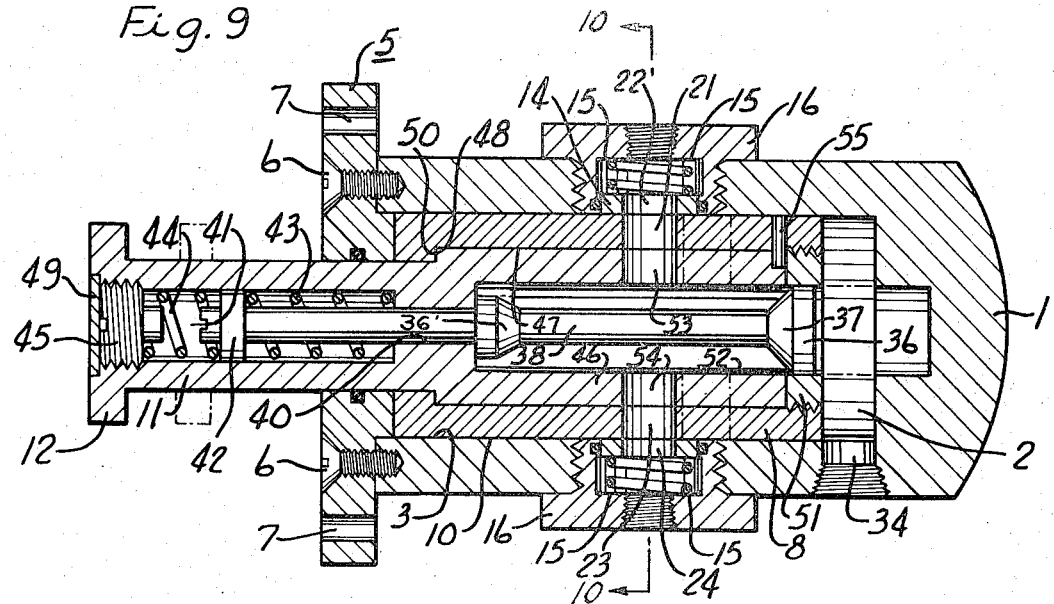
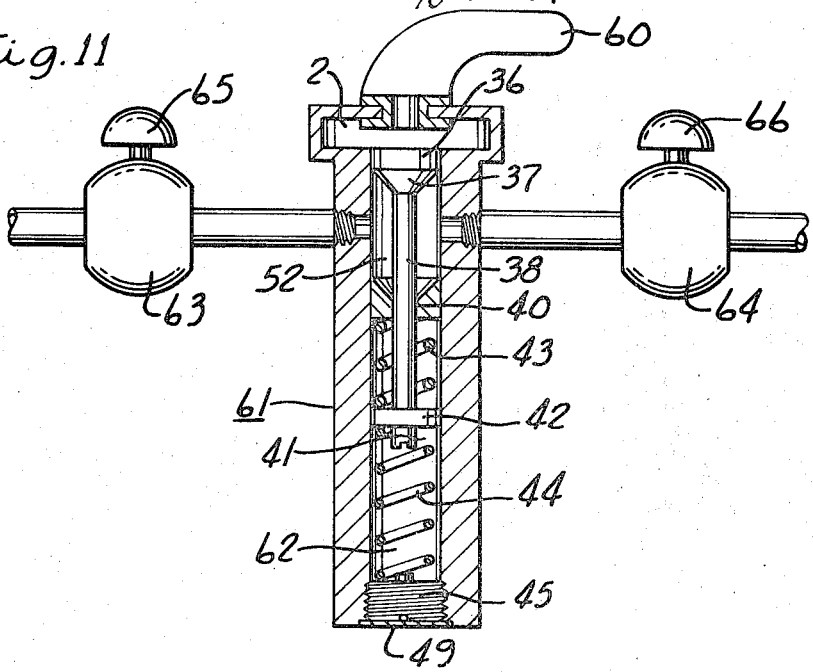

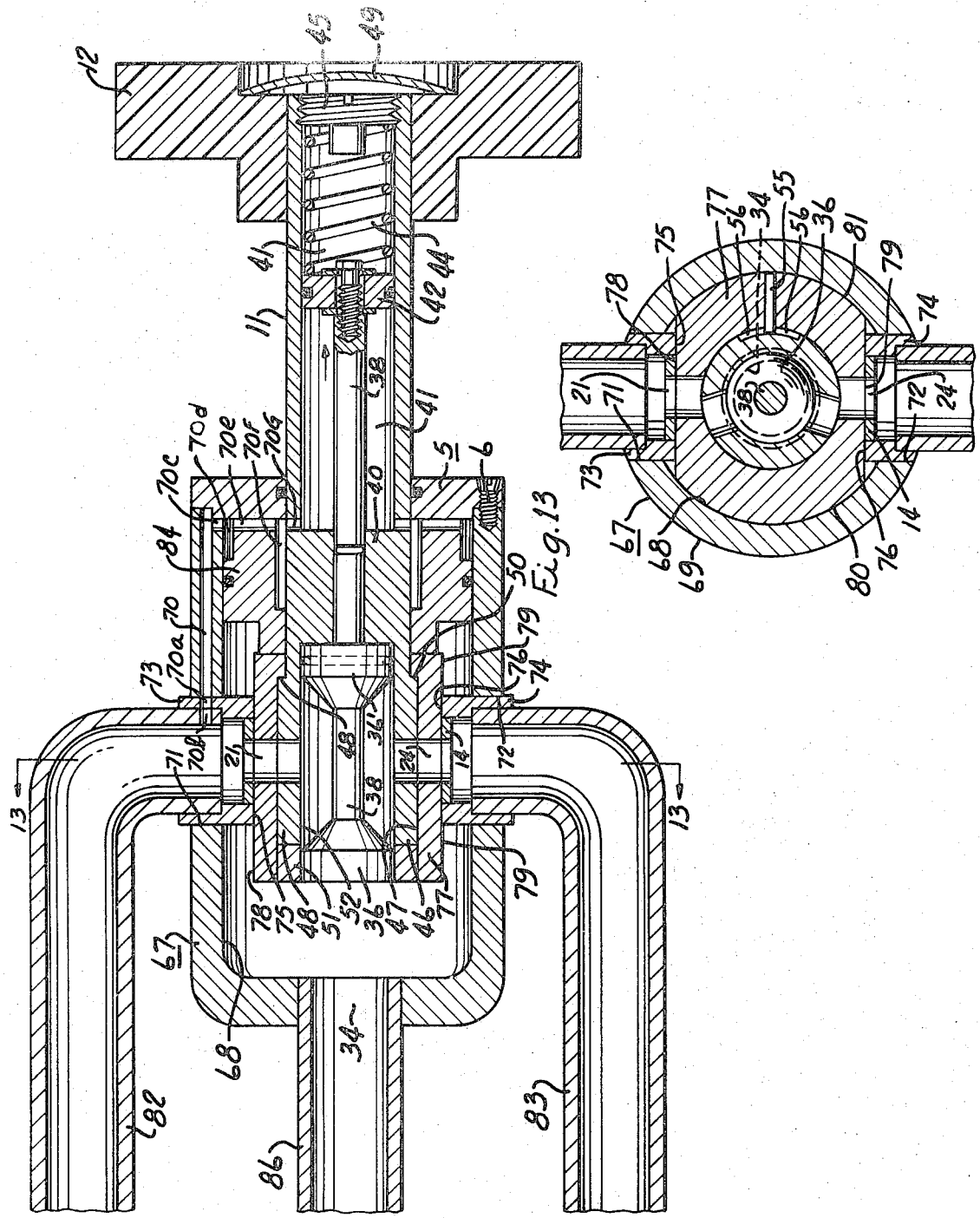

PRESSURE REGULATOR FAUCET SLIDE VALVE

CROSS REFERENCE TO RELATED APPLICATION

This application is a continuation-in-part of copending application, Ser. No. 765,776, filed Oct. 8, 1968, now abandoned.

SUMMARY OF THE INVENTION

This invention provides a slide valve having control and shut off parts in a flat face of a slide valve against which housing port lining seals are urged against the flat face of the slide valve to maintain sealed relation. The slide valve may be round and have one flat face or opposite flat faces or square, each with a housing having a mating valve chamber in which it slides. This slide valve may control a single fluid line or two fluid lines such as a hot and cold water faucet. The inlet ports to the valve housing are disposed normally to the valve chamber flat wall surface and cooperate with cooperating ports in the flat wall surface of the slide valve operable by a stem extending from the slide valve through one end of the valve housing. The outlet port is preferable in a flat wall face at the other end of the housing and the slide valve is operable to close both inlet and outlet valve ports at the same time.

The slide valve is provided with a bore to receive fluid from the lateral inlet ports and direct it to the end of the valve chamber where it passes laterally across the end of the slide valve to the outlet port.

The bore of the slide valve may be provided with a pressure regulating valve the head of which is frusto conical that opens the end of the bore into the valve chamber where the pressure controlled fluid passes to the outlet port. The stem of the valve passes through a guide into a chamber in the stem of the slide valve where its adjustable abutment is mounted between opposed spring means that determines the pressure of the fluid discharged from the valve.

The bore of the slide valve may receive a rotary selector valve having a stem with an operating knob. An abutment is threadably secured in the end of the bore of the slide valve to retain the rotary valve against axial movement with the slide valve bore and functions as the axial outlet port to the valve chamber where the fluid travels to the outlet port in the housing that is also closed by the slide valve. Thus the rotary selector valve functions as the operator for the slide valve. A stop is provided to limit the rotary movement of the selector valve. At each extreme position one of the two fluid ports fully mates with its corresponding fluid port in the slide valve and in its intermediate position both are connected to its axial bore and proportionately relative to the degree of rotation. This provides a mixture of hot and cold water.

In the last combination the pressure regulator valve is mounted in the bore of the rotary selector valve. The pressure regulator frusto conical valve head operates within the annular abutment that retains the rotary valve in the slide valve. The hollow stem of the rotary selector valve retains the opposed biased resilient means acting on the stem of the pressure regulating valve which passes through a guide between the rotary valve stem chamber and the chamber or bore in the rotary valve proper where it is attached to the pressure valve head.

The different combined structural valve features provide novel objects of this invention. The principal object being the provision of a single or dual water supply faucet that has a predetermined lower pressure control over the water discharged from the faucet. Another important object is the provision of a slide valve that has sealed ports which are not prone to develop leaks as in the present faucets and will provide very long life as a faucet valve.

Each of these valve features provide different cooperative combinations to produce different novel results.

Other objects and advantages of this invention appear hereinafter in the following description and claims.

The accompanying drawings show for the purpose of exemplification, without limiting the invention or claims thereto, certain practical embodiments illustrating the principles of the present invention wherein:

FIG. 3 is a sectional view of a slide valve with opposed and axially offset fluid ports in opposite flat faces mating with opposed flat faces in the housing.

FIG. 5 is a sectional view of a slide valve with a plurality of offset fluid ports in one flat face and a pressure device against another flat face both of which mate with corresponding flat faces in the housing with a coaxial pressure regulating valve, and which is closed when in the dotted line position.

FIG. 6 is a cross sectional view of the axially offset fluid ports of FIG. 5 and as shown along line 6—6 of FIG. 5.

FIG. 7 is a sectional view of a slide valve with a plurality of opposed and radially offset fluid ports in a cylindrical selector valve and selectively cooperating with ports in opposite flat slide valve faces mating with opposed flat faces in the housing, and which is closed when in the dotted line position.

FIG. 8 is a cross sectional view of the radially offset fluid ports in the selector valve of FIG. 7 and as shown along line 8—8 of FIG. 7.

FIG. 9 is a sectional view of a slide valve with a plurality of ports in opposite flat slide valve faces slidable axially to mate with complimentary ports in opposed flat faces in the housing and containing a bored cylindrical selector valve with cooperative radially offset ports and containing a pressure regulating valve, and which is closed when in the dotted line position.

FIG. 10 is a cross sectional view indicating the relative positions of the various ports in the housing and the slide valve and the selector valve and the pressure regulating valve and as shown along line 10—10 of FIG. 9.

FIG. 11 is a sectional view of a pressure regulating valve connected to receive the water from independent hot and cold water valves.

FIG. 12 is a sectional view of a slide valve with a plurality of ports in opposed flat slide valve faces slidable axially to mate with complimentary inner flat faces on radial inserts made integral with the cylindrical valve housing and containing a bore cylindrical selector valve with cooperative radially offset ports and containing a pressure regulating valve with its pressure regulating head guide supplied with fluid pressure through the valve cap.

FIG. 13 is a cross sectional view taken on the line 13—13 of FIG. 12 indicating the flat face means in the valve housing and on the slide valve.

Figure 1:
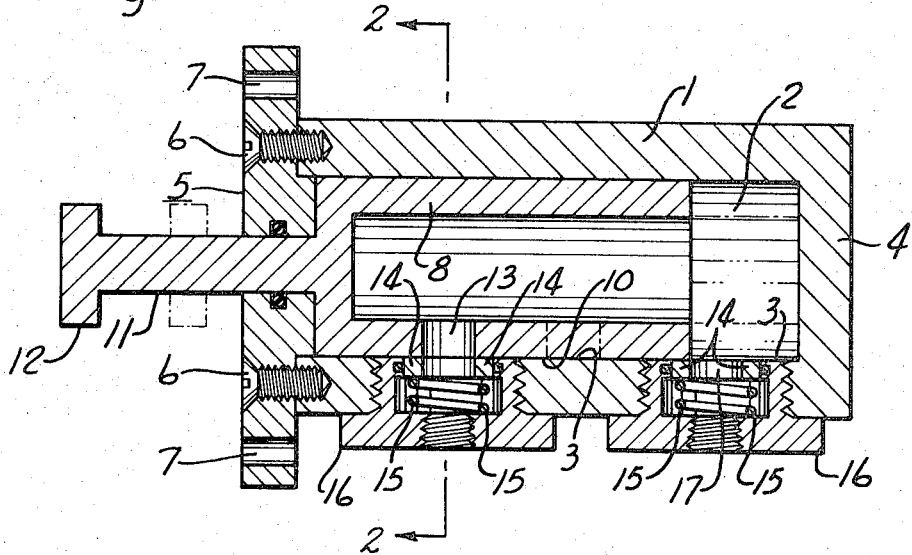
FIG. 1 is a sectional view of a slide valve with a single fluid port in a single flat face mating with a flat face in the housing, and which is closed when in the dotted line position.
Figure 2:
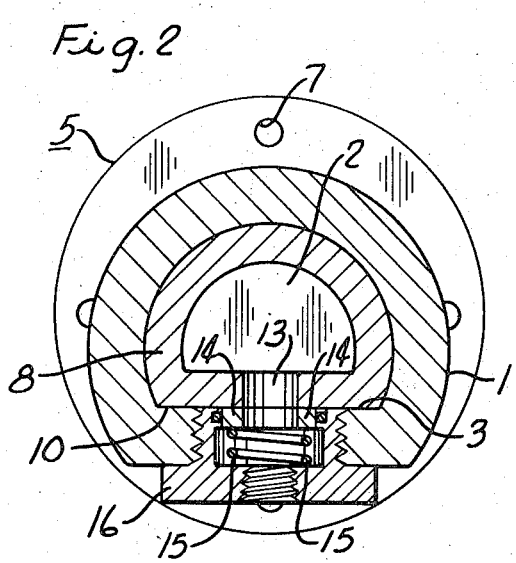
FIG. 2 is a cross sectional view of the fluid port of FIG. 1 and as shwon along line 2—2 of FIG. 1.

Referring to FIGS. 1 and 2, the valve housing 1 has a valve chamber 2 with a flat face 3 along one side thereof and is closed at its inner end by the wall 4 and at its outer end by the cap 5 secured to the housing 1 by means of the bolts 6. The cap 5 has openings 7 for mounting the valve housing. The slide valve 8 has a flat side 10 that mates with the flat face 3 of the valve chamber 2. The slide valve 8 has a sliding fit in the valve chamber 2 and its stem 11 sealed with an O ring passes therefrom and has the handle or knob 12 formed integral with the valve 8 as it is the only member operable in the valve chamber 2 in this structure.

The port 13 of the slide valve 8 is shown mating with the port liner 14 urged by the spring means 15 against the flat surface 10 of the slide valve 8. The port liner 14 and the spring 15 may be mounted in the housing 1 but are peeferably mounted in the port plug 16 threadably secured in the housing 1. A similar port plug is employed for the outlet port liner 17 which overlaps the end of the slide valve as shown so that its spring will not force the port liner 17 into the chamber 2. A liner need not be provided in this outlet as it is closed off by the slide valve and it is not subjected to the inlet pressure.

In this structure the dominant features are the mating flat face 10 of the slide valve 8 and the cooperative flat face 3 of the valve chamber 2 that slidably shut off the inlet 14 and the outlet 17.

Figure 4:
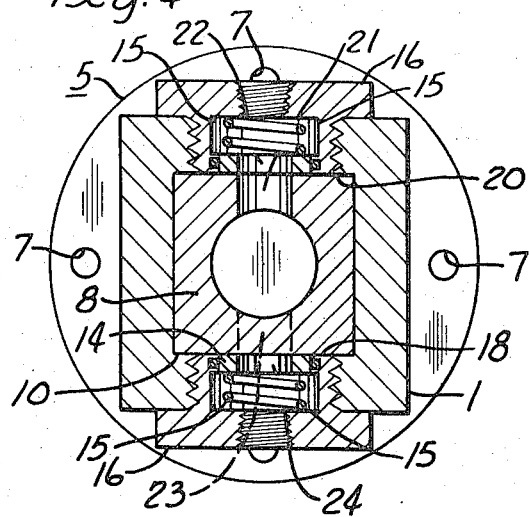
FIG. 4 is a cross sectional view of the axially offset fluid ports of FIG. 3 as shown along line 404 of FIG. 3 and which is closed when in the dotted line position.

In FIGS. 3 and 4 the housing 1 is similar as that shown in FIGS. 1 and 2 with the exception that the chamber 2 is square in cross section having two opposite flat faces 18 and 20 which contain their respective cold and hot water inlet ports 24 and 22 offset axially of each other in the housing 1 so that only hot water is obtained when the knob 12 is pulled all the way out to register port 21 with 22 and only cold water is obtained when the slide valve 8 is pushed in to register only port 23 with port 24 at which time a spring biased detent ball 25 registers with a recess 26 in the flat face 18 of the housing. The ball is offset from the port 24 so that the spring biased ball 25 may be inserted when the slide valve is mounted. However between the two ports one obtains a mixture of hot and cold water depending upon the degree of movement toward each inlet port. All ports are shut off by the slide valve when shoved all the way in the chamber 2.

Referring to FIGS. 5 and 6, the slide valve 8 and the chamber 2 are rectangular in cross section and the slide valve 8 and the valve chamber 2 have a mating shape with the exception of the pressure applying member 27 that lines one flat face 28 of the chamber 2. This pressure applying member resiliently forces the slide valve 8 against the flat face 3 of the chamber 2. The valve chamber 2 of these views has all the ports in the flat face 3 and none in the resilient member 27 although such ports could also be in this resilient member. The valve wall against the chamber wall 3 contains the ports 30 and 31 which are axially and laterally disposed relatively to each other and when the slide valve 8 is pulled out all the way the port 30 mates with the port 32 in the housing flat wall 3 and when the slide valve 8 is moved inwardly to mate the spring loaded ball 25 with the detent 26 the port 31 of the slide valve 8 will mate with the port 33 in the valve chamber wall 3. These ports 32 and 33 need no pressure biased liners since the pressure biasing member 27 is effective against the whole face 28 of the slide valve 8 to maintain sliding pressure of the valve 8 on the face 3 of the valve chamber. Thus the outer ends of these ports are threaded to receive their appropriate hot and cold lines.

Since the outlet port 34 is also closed by the flat face 10 of the valve 8 it does not need a biased port plug for the outlet for two reasons, one because of the pressure member 27 and the other because it is not a supply port.

In FIG. 5 the bore 35 of the slide valve is square in cross section to receive the square head 36 of the pressure regulating valve which has the frusto conical valve surface 37 ending in the stem 38 extending through the guide 40 into the hollow chamber 41 in the valve stem 11 where an adjustable guide member 42 is slidable in the chamber 41 to aid the guide 40 in holding the head 36 axially of the bore 35. A spring 43 between the guide member 42 and the guide 40 receiving the stem or valve head 36 in the bore 35 is provided to maintain the same closed until a predetermined pressure is present, lower than the inlet pressure through either ports 30 or 31, and is effective on said frusto conical surface 37 to move the head 36 and open this square port formed in the bore 35. The spring 44 opposes the effective pressure of the spring 43 to open the valve head 36. Thus these opposed springs 43 and 44 are chosen so that the adjustable abutment 42 and the adjustable abutment 45 for the spring 44 adjusts the pressure in the bore 35 of the slide valve 8 that permits this valve to discharge the water at a predetermined pressure into the back of the chamber 2 where it discharges from the outlet port 34.

The pressure of the opposed springs 44 and 43 cooperate with the pressure area of the head 36 in combination with the actual water pressure. The effective pressure area of the head 36 is the difference between the area of the head less the cross sectional area of the stem 38. In order to change the size and pressures of the opposed springs 44 and 43, that portion of the stem that enters the guide 40 to the chamber 41, may be increased and this provides a second head 36' in the chamber 35. This provides a differential between the heads 36 and 36' which reduces the effective water pressure area to open the chamber 35 to discharge. Head 36' can approach the area size of the head 36 but if there is no differential in the effective pressure areas of 36 and 36' and the relative pressures of the springs 43 and 44 are the same, then there could be no movement in the head 36 to open chamber 35 to discharge. Thus the spring 44 must open the control valve 36. This structure is applicable in FIGS. 9 to 11.

Referring to FIGS. 7 and 8 the slide valve 8 is not integral with the stem 11 and the flat wall surface 3 of the chamber 2 engages the flat surface 10 of the slide valve. Figuratively speaking, a rotary selector valve 46 is carved out of the center of slide valve providing a bore 47 with a shoulder 48 against which the shoulder 50 on the cylindrical rotary selector valve is seated and its outer cylindrical surface has a snug rotary fit in this slide valve bore 47. The cylindrical selector valve 46 is integral with the stem 11 and is rotated by the knob 12. This selector valve is retained in the slide valve bore by the ring abutment 51 threadably secured in the end of the bore 47. Thus the handle 12 and the stem 11 actuate the slide valve 8 as before since the selector valve 46 is retained therein against any relative axial movement. The central bore 52 of the selector valve 46 and the abutment 51 thus functions as the discharge bore to the end of the valve chamber 2 where it passes out of the chamber 2 through the discharge port 34.

In FIGS. 7 and 8, the slide valve ports 21 and 23 cooperate with their respective housing ports 22 and 24 in the same manner as in FIG. 3 by sliding passed the same to decrease and shut them off. However these ports 21 and 23 may be axially aligned since the radial ports 53 and 54 of the rotary selector valve are actually angularly disposed relative to each other. A stop pin 55 in the one flat wall face, and in FIG. 8 shown on the right side of the figure for convenience, is operable in an arcuate slot 56 formed in the end of the selector valve 46. When the knob 12 is turned to the center of the arcuate slot 56 both ports 53 and 54 are opened to their respective ports 21 and 23 in the slide valve 8. When selectively rotated counter-clockwise the port 21 is fully opened to port 53 and port 54 is shut off. When turned clockwise port 54 is fully opened and port 53 is shut off. Thus the selection of the fluid from the housing inlet ports 22 or 24 is determined by the arcuate position of the selector valve.

Referring to FIGS. 9 and 10, the structure is the same as that of FIGS. 7 and 8 with the addition of the pressure regulating valve with its head 36 slidably closing the bore 52 and its tapered frusto conical section 37 is the pressure bearing surface exposed to the bore 52. The fluid pressure that is forcibly applied to this portion of the head 36 urges it outwardly of the bore 52. When the effective fluid pressure against this surface 37 is greater than the effective spring pressure, the valve 36 opens and allows fluid to escape in accordance with the calibration of the pressure of the springs 43 and 44 on the stem abutment 42. As previously stated, the opposed head 36' must be of smaller area than head 37. Thus as in FIGS. 5, 9 and 11 the actual pressure of the fluid admitted to the discharge end of the chamber 2 is predetermined regardless of the inlet fluid pressure. The screw cap 41 adjusts the position of the abutment 42 and the screw abutment 45 adjusts the pressure of the spring 44 that supplements the fluid pressure on the valve head 36. If the inlet fluid pressure with the aid of the pressure of the spring 44 is less than the spring setting 43, the valve head 36 cannot open.

The novelty of this pressure regulator in this slide valve structure 8 resides in the fact that the position of the slide valve 8 has no effect on the operation of the pressure regulating valve so long as one or more of the valve ports are cracked to admit fluid into the bore of the selector valve. Of course if the ports are closed admitting no pressure the pressure regulator has no reason to function.

The pressed metal lids 49 enclose the adjustable abutment 45 in the knob 12. This knob may be held in place by a set screw or pin entering a socket in the stem 11.

Referring to FIG. 11 the structure shown simulates an ordinary faucet structure having a discharge valve chamber 2 leading to the faucet proper 60 on the top of the housing 61 containing the pressure regulator valve 36. This bore 52 has the guide 40 that separates bore 52 and bore 62 in this housing 61. In place of the slide valves of the previous figures ordinary valves 63 and 64 with their operating handles 65 and 66 that operate independently. They may be any character of faucet valve with a screw operator or with a tapered plug that pulls to open a lateral sleeve known on the market as a "Cole valve".

In this structure the selection of the water is independent of the water pressure regulator whereas in the other structures one cannot make them independent since the slide valve 8 must supply the fluid to the regulating valve and the position of the slide valve cannot effect the operation regulating unless the slide valve 8 is shut off the ports.

Referring to FIGS. 12 and 13, the fundamental structure is the same as FIG. 9 with the exception that the valve body or housing 67 has a cylindrical surface or bore 68 and cylindrical outer surface 69. This valve body as shown here is made of metal and may be formed by being drawn, spun, cast or machined since in this instance the valve body is cylindrical. The outlet 34 may be through the side or end as shown in FIG. 13. The wall of this valve body 67 should be sufficiently thick to accommodate a longitduinal fluid pressure passage 70 from the open end of this housing to one of the lateral openings 71, or 72 for the water inlets. These openings retain the inserts 73 and 74 to this control valve. The inner ends of these inserts or plugs have a flat ground face means 75 and 76 to cooperatively fit and seal with the opposed flat ground face means 78 and 79 of the slide valve 77 as claimed. This slide valve 77 is cylindrical to fit the circular bore 68; however the opposite cooperative flat ground face means 78 and 79 are each ground to have a sliding sealing fit against the opposed flat ground face means 75 and 76 of said inserts 73 and 74 at the same time the cylindrical portions 80 and 81 of the slide valve 77 fit the bore 68 of the valve body 67.

The port plugs or inserts 73 and 74, for the cold and hot inlet ports 21 and 24, in FIGS. 12 to 14 are preferably shrunk by lowering their temperature so that they may be inserted in the holes 71 and 72 with their ground flat face means 75 and 76 abutting against the faces of a gauge block simulating the ground flat face means of the slide valve 77. When these plugs or inserts are sufficiently chilled to enter the holes 71 and 72 and are held against the gauge block until they warm up they will seize in their respective holes. The port liners 14 which may be steel but here aere preferably a plastic such as known in the market as nylon or teflon or other similar material.

The cold water inlet plug 73 and its inlet pipe 82 inserted in the plug bore, have this lateral fluid openings 70a and 70b aligned with the fluid pressure passage 70.

The cold and hot water inlet pipe 82 and 83 are retained in the inserts 73 and 74. The pipes 82, 83 and discharge pipe 86 are directed to the closed end of the control valve to support the same upon connection when installing.

The gauge block is replaced by the slide valve 77. The housing valve cap 5 has annularly spaced mounting openings to receive the bolts 6 threadably received in the wall of the housing 67. The seal and valve stem support 84 is integral with the cap 5 and extends into the bore 68 of the valve body to support the slide valve 77 which is bored to receive the valve stem 11 and the body of the rotary selector valve 46 with its open bore 47 extending inwardly.

The slide valve 77 has a bore 47 and an inturned flange forming the annular shoulder 48 to engage the shoulder 50 on the selector valve body 46 that may be rotated by the knob 12 through the integral selector valve stem 11. The flange forming the shoulder 48 provides an opening through which the stem 11 extends and the rotatable selector valve 46 is retained in the bore 47 of the slide valve 77 by the abutment ring 51 threadably secured or seized by a shrink fit in the end of the bore 47. Both the selector valve 46 and the slide valve 77 are actuated by the knob 12. The selector valve 46 has an inner bore 52 which extends through the abutment ring 51 to receive the pressure regulating valve with its connected heads 36 and 36' which form a spool and have a sliding fit in the bore 52 providing a pressure balancing valve. The heads 36 and 36' are connected by the stem 38 which also extends through the stem guide 40 into the stem chamber 41 and has an adjustably mounted abutment 42 on the end of said stem. This adjustment may be made by placing spacer washers under the head or under the fastening bolt as shown in FIG. 12 where one washer is under the head 42 and one on top. This head 42 is sealed by an O ring with the wall of the chamber 41.

A spring 44 in the outer end of said valve stem chamber 41 engages between the adjustable abutment 45 and the outer face of said movable abutment or guide head 42 to control the position of the pressure regulating valve head 36 and the bore 52 to adjust the pressure of the water leaving the end of the bore to the discharge opening 34. The adjustable abutment 45 is enclosed by the cap 49.

The pressure of the spring 44 against the movable abutment or guide head 42 is opposed by the inlet water pressure to the opposite side of the abutment. The inlet water pressure is shown to be connected through the lateral openings 70a and 70b of the cold water inlet to the longitudinal passage 70 in the valve body 67 and the lateral opening or openings 70c through the valve body to the annular chamber 70d formed in the annular surface of the plug on the cap 5 and to the radial ports 70e through the plug of the cap 5 to the annular chamber 70f formed in the bore of the plug of the cap 5, thence through the radial ports 70g of the stem 11 to the chamber 41 on the opposite side of the guide 40 and between the latter and the movable abutment 42, the spring 44 being on the other side of the movable abutment 42.

Thus regardless of the position of the slide valve 77 or the selector valve 46 the inlet water pressure is effective to oppose the pressure of the adjustable spring 44 on the head guide 42 to position the head 36 of the regulating valve spool relative to the discharge opening through the end of the bore 52 of the control valve 46. If the slide valve is closed this valve may or may not be open to discharge 34 depending upon the relative pressures on opposite sides of the valve head guide 42. If the slide valve 77 is open partially or fully to one or both of the inlet ports the selected amount of water is passed to discharge 34 at the regulated pressure determined by this pressure regulating valve.

O type sealing rings are employed not only on the movable abutment guide head 42 but also in the cap bore to seal the stem 11, the stem 38 in the bore of the guide 40, the head 36' in the bore 52, and on the cylindrical surface of the cap 5 in the bore 68 of the valve housing 67. In no instance do these O rings pass over an opening but merely form a seal. The ground flat surfaces 78 and 79 of the slide valve 77 seal with the ground flat faces 75 and 76 of the inserts to seal the parts 21 and 24 which are augmented by the plastic washer seals 14 forced into sealing relation by the water pressure to provide an additional seal.

The inlet pipes 82 and 83 together with the discharge pipe 86 are secured to the valve body inserts 73 and 74 and the valve body 67 in any suitable manner and are drawn rearwardly of the valve body 67 to be fastened to the building structure for supporting the valve body. The usual decorating rings may be fastened to the face of the valve cap 5 under the control handle or knob 12.

In FIG. 13, taken on the line 13—13 of FIG. 12, it is shown that the inserts 73 and 74 extend into the bore 68 to provide slight openings at each side of their flat surfaces 75 and 76. This requires the flat parallel faces 78 and 79 to be sufficiently close together to allow a small passage at each side of said inserts to connect their fluid spaces together and to the discharge port.

The pin 55 extending through the slide valve wall into the arcuate slot 56 of the cylindrical portion of the selector valve 46 limits the rotary movement of this selector valve in fully aligning either inlet port 21 or 24 or a selective fraction of each to mix the water from these ports.

These valves may have the body and the regulating sections made of brass properly coated with with a durable fluid wearing surface. The open end of the body and the plug end of the sleeve require adequate sealing. The wearing surfaces are the ground surfaces 75 and 76 of the inserts 73 and 74 and their complimentary ground surfaces 78 and 79 of the slide valve 77 which are preferably a hard stainless for good wearing quality without leaking. The washers 14 also aid in sealing these ports.

Each of these parts may be duplicated in cast materials and also plastics to enable the use of the advantages of these structures.

I claim:

1. A single knob stem actuated fluid slide valve operable in a valve chamber enclosed in a housing with a removable cap sealing the stem end and an outlet port means adjacent its other end with at least two inlet port means positioned in the housing wall intermediate thereof, characterized by a bore in said slide valve, at least one flat face means on said valve chamber wall within said housing, said flat face means containing said inlet port means with flat bearing surfaces on each side thereof, a cooperative mating flat face means on said slide valve in sealing slidable engagement with said valve chamber flat face means, inlet port means in said slide valve flat face means connected to said slide valve bore and cooperating to selectively have full registration with said housing inlet port means to have full fluid flow through said slide valve bore to said housing outlet port means, said slide valve being axially slidable by said stem to offset said flat face inlet port means relative to each other to vary and interrupt the fluid flow to said outlet port means, a pressure regulating valve having a stem slidably extending from an externally accessible chamber in said slide valve operating stem into said slide valve bore, a head on said pressure regulating valve stem intermediate said slide valve inlet port means and said outlet port means fitting said slide valve bore and displaceable to open said slide valve bore to said outlet port means to function as a pressure control valve surface, an axial adjustment abutment on the end of said pressure regulating valve stem in said slide valve stem chamber, pressure means effective on the opposite sides of said adjustable abutment with the opposite sides facing opposed shoulders closing said slide valve stem chamber to regulate the pressure of the fluid against said head and passing between said head and the end of said slide valve bore to said outlet port means.

2. The structure of claim 1 characterized in that said pressure means effective on the opposite sides of said adjustable abutment are springs engaging between said abutment sides and shoulders respectively.

3. The structure of claim 1 characterized by an intermediate guide portion for said pressure regulating valve stem between said slide valve bore and said slide valve stem chamber.

4. The structure of claim 1 characterized by a second head of smaller area than said first head on said pressure regulating valve stem and opposing said first head on said regulating valve stem, said regulating valve stem extending from said second head through a guide to said adjustable abutment in said adjacent and externally accessible chamber in said fluid slide valve operating stem.

5. The structure of claim 1 characterized in that said adjustable abutment includes screw means externally adjustable in said accessible chamber to be effective to change the pressure on said adjustable abutment to change the discharge fluid pressure.

6. The structure of claim 1 further characterized in that a radial means extending through the wall of said housing and containing said controlled fluid housing inlet port means to said valve chamber, said flat face means on said valve chamber wall being on the inner end surfaces of said radial means in said valve chamber and cooperating in sealing engagement with said slide valve flat face means and their respective inlet port means, said radial means containing valve housing inlet port means are metal inserts and are seized in openings in said valve housing to seal therewith.

7. The structure of claim 1 characterized in that a radial means extending through the wall of said housing and containing said controlled fluid housing inlet port means to said valve chamber, said flat face means on said valve chamber wall being on the inner end surfaces of said radial means in said valve chamber and cooperating in sealing engagement with said slide valve flat face means and their respective inlet port means, said valve structure including said housing and slide valve and thei cooperative flat face means are integral.

8. The structure of claim 1 characterized in that said pressure opposed side of said abutment to apply pressure means thereon to urge said head toward its closed position in said slide valve operating stem chamber includes open passageways from one valve inlet port means to said stem chamber to subject the fluid pressure against one side of said abutment to apply said opposed pressure thereon and thus regulate the pressure of the fluid to discharge.

9. The structure of claim 1 characterized in that said pressure means in said slide valve operating stem chamber includes resilient means engaging one side of said adjustable abutment to apply pressure thereon to retain said head in its open position, and said pressure means applied to said other side of said abutment in said stem chamber is effective to oppose said resilient means to move said head to maintain said valve closed upon predetermined fluid pressure in said stem chamber.

10. The structue of claim 1 wherein a radial means extending through the wall of said housing and containing said controlled fluid housing inlet port means to said valve chamber, said flat face means on said valve chamber wall being on the inner end surfaces of said radial means in said valve chamber and cooperating in sealing engagement with said slide valve flat face means and their respective inlet port means, said radial means are cylindrical inserts sealed in said housing which is tubular and closed at one end by said removable cap, a passage carried by said housing from a fluid inlet port means connected to a second passage in said cap which in turn is connected by a third passage through said stem to be effective on one side of said abutment to oppose the pressure against the other side of said abutment for providing pressure tending to close said pressure regulating valve.

11. The structure of claim 1 wherein said housing is tubular with a cylindrical bore and said inlet port means are connected by tubing extending from opposite sides, said outlet port means extending from one end of said housing, said removable cap means closing the other end of said slide valve chamber and having a plug sealing in said housing bore and providing a guide with a seal engaging said valve stem which extends therethrough and operates therein, said cap plug and said closed housing end forming reciprocal stop limits of said slide valve which comprises a sleeve with an inturned flange on one end and a bore ring in its other end to receive said pressure regulator valve head providing the fluid pressure controlled outlet port means and also to provide retainer means for a rotary selector valve means.

12. The single knob stem actuated fluid slide valve of claim 1 characterized by said flat face means of said slide valve closing said outlet port means when closing said inlet port means.

13. A single knob stem actuated fluid slide valve operable in a valve chamber enclosed in a housing with a removable cap sealing the stem end and an outlet port means adjacent its other end with at least two inlet port means positioned in the housing wall intermediate thereof, characterized by a bore in said slide valve, at least one flat face means on said valve chamber wall within said housing, said flat face means containing said inlet port means with flat bearing surfaces on each side thereof, a cooperative mating flat face means on said slide valve in sealing slidable engagement with said valve chamber flat face means, inlet port means in said slide valve flat face means connected to said slide valve bore and cooperating to selectively have full registration with said housing inlet port means to have full fluid flow through said slide valve bore to said housing outlet port means, said slide valve being axially slidable by said stem to offet said flat face inlet port means relative to each other to vary and interrupt the fluid flow to said outlet port means, an annular shoulder in the bore of said slide valve, a rotatable selector valve fitting said slide valve bore and against said shoulder and secured to said slide valve stem at one end for relative rotation therein and having a bore open at its other end to said outlet port means, a ring abutment secured in the end of said slide valve bore to retain said rotary selector valve in said slide valve bore, inlet port means in said rotary selector valve to fully mate with their respective inlet port means in said slide valve or in varying degrees with said inlet port means depending upon the degree of rotation of said selector valve in said slide valve bore, whereby when said inlet port means are in registration the fluid flows through said open end bore of said selector valve and said ring abutment to said outlet port means.

14. The structure of claim 13 characterized by a pressure regulating valve having a stem slidably extending from an externally accessible chamber in said valve stem actuating means into said selector valve bore, a head on said pressure regulating valve stem and fitting said selector valve bore and the bore in said abutment ring and displaceable to open said selector valve bore to said outlet port means to function as a pressure control valve surface, an axial adjustable abutment on the end of said pressure regulating valve stem in the chamber in said valve stem actuating means, pressure means effective on the opposite sides of said adjustable abutment with the opposite sides facing opposed shoulders closing said stem chamber in said selector and slide valve actuating stem to regulate the pressure of the fluid against said head and passing between said head and the end and said abutment ring bore to said outlet port means.

15. The structure of claim 13 characterized by an arcuate slot in said selector valve, a stop pin in said slide valve extending into said arcuate slot to limit the rotary movement of said inlet port means in said selector valve from full mating position with only one inlet port means to full mating position with only the other inlet port means and various degrees therebetween.

* * * * *